US011593707B2

(12) United States Patent
Romero et al.

(10) Patent No.: US 11,593,707 B2
(45) Date of Patent: Feb. 28, 2023

(54) COMPRESSED UNSUPERVISED QUANTUM STATE PREPARATION WITH QUANTUM AUTOENCODERS

(71) Applicant: Zapata Computing, Inc., Boston, MA (US)

(72) Inventors: Jhonathan Romero, Somerville, MA (US); Jonathan Olson, Cambridge, MA (US); Alan Aspuru-Guzik, Toronto (CA)

(73) Assignee: Zapata Computing, Inc., Boston, MA (US)

( * ) Notice: Subject to any disclaimer, the term of this patent is extended or adjusted under 35 U.S.C. 154(b) by 847 days.

(21) Appl. No.: 16/460,827

(22) Filed: Jul. 2, 2019

(65) Prior Publication Data

US 2020/0005186 A1    Jan. 2, 2020

Related U.S. Application Data

(60) Provisional application No. 62/833,280, filed on Apr. 12, 2019, provisional application No. 62/693,077, filed on Jul. 2, 2018.

(51) Int. Cl.
*G06N 20/00* (2019.01)
*G06N 10/00* (2022.01)

(52) U.S. Cl.
CPC ............ *G06N 20/00* (2019.01); *G06N 10/00* (2019.01)

(58) Field of Classification Search
CPC ........ G06N 20/00; G06N 10/00; G06N 99/00; G06N 1/00; G06F 9/455; G06F 9/48; G06F 17/10; G06F 17/12; G06F 17/50; G06F 15/82; G06F 15/08; B82Y 10/00; G06G 7/58; H01L 39/22
See application file for complete search history.

(56) References Cited

U.S. PATENT DOCUMENTS

| | | | |
|---|---|---|---|
| 9,152,746 B2 | 10/2015 | Troyer et al. |
| 10,133,984 B2 | 11/2018 | Clarke et al. |
| 10,452,989 B2 | 10/2019 | Majumdar |
| 11,468,357 B2 | 10/2022 | Johnson et al. |
| 2007/0239366 A1 | 10/2007 | Hilton et al. |

(Continued)

FOREIGN PATENT DOCUMENTS

| KR | 20180004226 A | 1/2018 |
|---|---|---|
| KR | 20180022925 A | 3/2018 |

(Continued)

OTHER PUBLICATIONS

Lamata, "Quantum Autoencoders via Quantum Adders with Genetic Algorithms", Sep. 2017. (Year: 2017).*

(Continued)

*Primary Examiner* — Dave Misir
(74) *Attorney, Agent, or Firm* — Blueshift IP, LLC; Robert Plotkin

(57) ABSTRACT

A system and method include techniques for: generating, by a quantum autoencoder, based on a set of quantum states encoded in a set of qubits, a decoder circuit that acts on a subset of the set of qubits, a size of the subset being less than a size of the set; and generating a reduced-cost circuit, the reduced-cost circuit comprising: (1) a new parameterized quantum circuit acting only on the subset of the set of qubits, and (2) the decoder circuit.

16 Claims, 7 Drawing Sheets

(56) References Cited

U.S. PATENT DOCUMENTS

| | | |
|---|---|---|
| 2015/0006443 A1 | 1/2015 | Rose |
| 2016/0283857 A1 | 9/2016 | Babbush et al. |
| 2016/0328253 A1 | 11/2016 | Majumdar |
| 2017/0091649 A1 | 3/2017 | Clarke et al. |
| 2018/0101784 A1* | 4/2018 | Rolfe .................... G06N 3/088 |
| 2018/0260245 A1 | 9/2018 | Smith |
| 2019/0018912 A1* | 1/2019 | Mosca .................. G06N 99/00 |
| 2019/0156239 A1* | 5/2019 | Martinis ............... G06N 10/00 |
| 2019/0164034 A1* | 5/2019 | Gambetta ............. G06N 10/00 |
| 2020/0160204 A1 | 5/2020 | Johnson et al. |

FOREIGN PATENT DOCUMENTS

| | | |
|---|---|---|
| WO | 2005093649 A1 | 10/2005 |
| WO | 2017031356 A1 | 2/2017 |
| WO | 2017116446 A1 | 7/2017 |
| WO | 2017214717 A1 | 12/2017 |
| WO | 2020010147 A1 | 1/2020 |
| WO | 2020037300 A1 | 2/2020 |
| WO | 2020106955 A1 | 5/2020 |
| WO | 2021055507 A1 | 3/2021 |

OTHER PUBLICATIONS

Khoshaman, "Quantum Variational Autoencoder", Feb. 2018. (Year: 2018).*

Wetzel, "Unsupervised learning of phase transitions: from principal component analysis to variational autoencoders", Mar. 2017. (Year: 2017).*

Biamonte, J.D., "Quantum Machine Learning Matrix Product States," arXiv:1804.02398v1, Apr. 6, 2018, 9 pages. [Retrieved on Jan. 20, 2020]. Retrieved from<https://arxiv.org/abs/1804.02398v1>.

Bruognolo, "Tensor network techniques for strongly correlated systems: Simulating the quantum many-body wavefunction in zero, one, and two dimensions," LMU PhD Thesis, Jul. 6, 2017, 98 pages. retrieved on Jan. 20, 2020]. Retrieved from <https://www.theorie.physik.uni-muenchen.de/lsvondelft/publications/phd/index.html>.

International Search Report and Written Opinion dated Oct. 23, 2019 by the Korean Intellectual Property Office in International patent application No. PCT/US2019/040406, 8 pages.

International Search Report and Written Opinion dated Jan. 29, 2020, in International Patent Application No. PCT/US2019/046964, 11 pages.

McClean, J.R., et al., "Barren plateaus in quantum neural network training landscapes," Nature communications, arXiv:1803.11173, pp. 1-6 (2018).

Preskill, J., "Quantum Computing in the NISQ era and beyond," arXiv preprint arXiv:1801.00862, pp. 1-20 (2018).

Kivlichan, I.D. et al., "Quantum simulation of electronic structure with linear depth and connectivity," Physical Review Letters, 120(11):110501, 2018, pp. 1-8 (2018).

Wan, K.H., et al., "Quantum generalisation of feedforward neural networks," npj Quantum Information, vol. 3, Article No. 36, arXiv:1612.01045, pp. 1-8 (2017).

Lamata, L., et al., "Quantum autoencoders via quantum adders with genetic algorithms," arXiv:1709.07409 [quant-ph], pp. 1-8 (2018).

McCaskey, A., et al., "Validating Quantum-Classical Programming Models with Tensor Network Simulations," arXiv:1807.07914v1, pp. 1-11 [retrieved on Jan. 20, 2020]. Retrieved from https://arxiv.org/abs/1807.07914v1 (Jul. 20, 2018).

Jozsa, R., et al., "Matchgates and classical simulation of quantum circuits," Proceedings of the Royal Society A: Mathematical, Physical and Engineering Science, 464 (2100):3089-310J., 6, pp. 1-18 (2008).

Romero, J. et al., "Quantum autoencoders for efficient compression of quantum data," Quantum Science and Technology, vol. 2 (4):045001, pp. 1-10 (2017).

Ramelow, S., et al., "Matchgate quantum computing and non-local process analysis," arXiv:0909.3016v1, pp. 1-11 (2011).

Anschuetz, E.R., et al., "Variational Quantum factoring," Quantum Technology and Optimization Problems, arXiv preprint arXiv:1808.08927, pp. 1-18 (Aug. 27, 2018).

Calderbank, A.R., et al., "A group-theoretic framework for the construction of packings in grassmannian spaces," Journal of Algebraic Combinatorics, vol. 9, No. 2, pp. 129-140 (1999).

Chao, R., et al., "Overlapping qubits," Quantum Physics, arXiv:1701.01062v1, pp. 1-22 (Jan. 4, 2017).

Crooks, G.E., "Performance of the Quantum Approximate Optimization Algorithm on the Maximum Cut Problem," Quantum Physics, arXiv:1811.08419v1, pp. 1-6, (Nov. 20, 2018).

Farhi, E., et al., "A quantum approximate optimization algorithm," Quantum Physics arXiv:1411.4028v1, pp. 1-16 (Nov. 14, 2014).

Goemans, M.X., and Williamson, D.P., "Improved approximation algorithms for maximum cut and satisfiability problems using semidefinite programming," Journal of the ACM (JACM), vol. 42, No. 6, pp. 1115-1145 (Nov. 1995).

International Search Report & Written Opinion dated Dec. 30, 2020, in international patent application No. PCT/US2020/051115, 9 pages.

International Search Report & Written Opinion dated Mar. 12, 2020 in International patent application No. PCT/US2019/062612, 7 pages.

Johnson, W.B., and Lindenstrauss, J., "Extensions of Lipschitz mappings into a Hilbert space," Contemporary mathematics, vol. 26, No. 1, pp. 189-206 (Jan. 1984).

Karp, R.M., "Reducibility among combinatorial problems," Complexity of computer computations, pp. 85-103 (1972).

Khot, S., "On the power of unique 2-prover 1-round games," Proceedings of the thiry-fourth annual ACM symposium on Theory of computing, pp. 767-775 (May 2002).

Pichler, H., et al., "Quantum optimization for maximum independent set using rydberg atom arrays," arXiv:1808.10816v1, pp. 1-13 (Aug. 31, 2018).

Shor, P.W., and Sloane, N.J.A., "A family of optimal packings in grassmannian manifolds," Journal of Algebraic Combinatorics, vol. 7, No. 2, pp. 157-163 (1998).

Trevisan, L., et al., "Gadgets, approximation, and linear programming," SIAM Journal on Computing, vol. 29, No. 6, pp. 2074-2097 (2000).

Restriction Requirement dated Aug. 12, 2022, in U.S. Appl. No. 16/543,470 of Yudong Cao, filed Aug. 16, 2019, 6 pages.

Notice of Allowance dated May 27, 2022, in U.S. Appl. No. 16/691,015 of Peter D. Johnson, filed Nov. 21, 2019, 19 pages.

* cited by examiner

COMPRESSED UNSUPERVISED QUANTUM STATE PREPARATION WITH QUANTUM AUTOENCODERS

CROSS-REFERENCE TO RELATED APPLICATIONS

This application claims priority to U.S. Provisional Patent Application No. 62/693,077, filed Jul. 2, 2018, and U.S. Provisional Patent Application No. 62/833,280, filed Apr. 12, 2019. Each of these applications is incorporated herein by reference in its entirety.

BACKGROUND

Initial state preparation can be a troublesome task for near-term quantum computers where circuit depth is the primary hurdle for useful quantum protocols. Because quantum gates are inherently noisy, improvements in near-term algorithms are typically associated with simply reducing the gate depth of a desired operation or a variational ansatz. For instance, algorithms such as Variational-Quantum-Eigen-solver (VQE) try to prepare approximate ground states of a molecular electronic Hamiltonian, but the size of the system they can simulate and the accuracy of the simulation is directly tied to the depth of the corresponding circuit ansatz.

What is needed, therefore, are improvements in initial state preparation for quantum computers.

SUMMARY

While quantum computers can potentially provide exponential speed increases for certain types of algorithms (e.g., prime number factorization), decoherence remains a technical obstacle limiting their development and wide-spread use. Decoherence is the process by which information encoded in qubits of the quantum computer is lost. For example, thermal noise coupling to the qubits from the surrounding environment (e.g., blackbody radiation) can drive the qubits, causing them to randomly change states and/or evolve over time in unexpected and/or unintended ways. Decoherence, which arises from many sources, establishes a coherence lifetime within which a quantum algorithm, running on the quantum computer, must be completed to ensure the integrity of the output.

A quantum circuit is implemented as quantum gates applied to the qubits. The quantum gates are arranged in a sequence of time slots, in each of which a qubit is operated on by at most one quantum gate. The integer number of time slots in the sequence defines depth of the quantum circuit. Thus, quantum circuit depth is limited by the coherence time. For some types of qubits, coherence times exceeding several seconds have been reported for one and two-qubit quantum computers. For systems with greater number of qubits, typical coherence times may be less than one millisecond.

Systems and methods presented herein, collectively referred to as compressed unsupervised state preparation (CUSP), reduce circuit depth for quantum-state generator circuits. This advantageously speeds up initial state generation, in turn providing at least three key benefits for quantum computers. First, with CUSP, a subsequent quantum circuit has extra time to act on the initial state before reaching any limitation imposed by the coherence time. With this extra time, the subsequent circuit finishes sooner, and is therefore less susceptible to decoherence-induced errors. Alternatively, the extra time can be used to implement a longer subsequent quantum circuit (i.e., one with increased circuit depth) to achieve results not previously attainable.

Second, the speed-up achieved by CUSP can be used to generate an initial state with more qubits (i.e., higher dimensions). In general, a quantum-state generator requires a circuit depth scaling exponentially with the number of qubits, and thus requires an exponentially-increasing amount of time to run. The ability to prepare initial states with more qubits will benefit VQE, among other quantum algorithms, by facilitating quantum chemical simulations of more complex molecules. These simulations are useful for materials design and pharmacological research, among other applications.

Third, the speed-up achieved by CUSP can be used to generate a more precise initial state, i.e., how close the output of the generator circuit matches a desired target state. In general, creating an arbitrary quantum state to within a specified level of precision requires a circuit depth scaling exponentially with the precision, and thus also requires an exponentially-increasing amount of time to run. The ability to prepare initial states more precisely will benefit VQE, among other quantum algorithms, by improving accuracy of the results. Again, such benefits to VQE can help advance materials design and pharmacological research, among other applications.

One aspect of the invention is directed to a method which includes: generating, by a quantum autoencoder, based on a set of quantum states encoded in a set of qubits, a decoder circuit that acts on a subset of the set of qubits, a size of the subset being less than a size of the set; and generating a reduced-cost circuit, the reduced-cost circuit comprising: (1) a new parameterized quantum circuit acting only on the subset of the set of qubits, and (2) the decoder circuit.

The method may further include: receiving the set of quantum states generated by at least one quantum circuit, having a depth D1 and a first cost function having a first cost value C1. Generating the reduced-cost circuit may include generating the reduced-cost circuit to act on the set of qubits, the reduced-cost circuit having a second depth D2 and being associated with a corresponding second cost function having a second cost value C2, wherein at least one of the following is true: (1) C2 is less than C1; and (2) D2 is less than D1. C2 may be less than C1 and D2 may be less than D1. C2 may be less than C1. D2 may be less than D1. The first cost function may calculate a first energy cost and the second cost function may calculate a second energy cost. The first cost function may represent a first function of a first number of gates within a circuit and the second cost function may represent a second function of a second number of gates within the circuit. The first cost function may represent a first fidelity F1 of a first output state of the decoder circuit compared to a reference state. The second cost function may represent a second fidelity F2 of a second output state of the decoder circuit compared to the reference state, wherein F1<F2.

Generating the reduced-cost circuit may include training an encoder circuit and the decoder circuit with the new parameterized quantum circuit to optimize average fidelity of a plurality of training states. The training may include training a first subset of the encoder circuit to reduce the second space by a single qubit. The training may include training a second subset of the encoder circuit to reduce the second space by a single qubit.

Another aspect of the present invention is directed to a system which includes: a quantum autoencoder (i) generating, based on a set of quantum states encoded in a set of qubits, a decoder circuit that acts on a subset of the set of qubits, a size of the subset being less than a size of the set; and a reduced-cost circuit generator generating a reduced-cost circuit, the reduced-cost circuit comprising: (1) a new parameterized quantum circuit acting only on the subset of the set of qubits, and (2) the decoder circuit.

DETAILED DESCRIPTION

Figure 1:
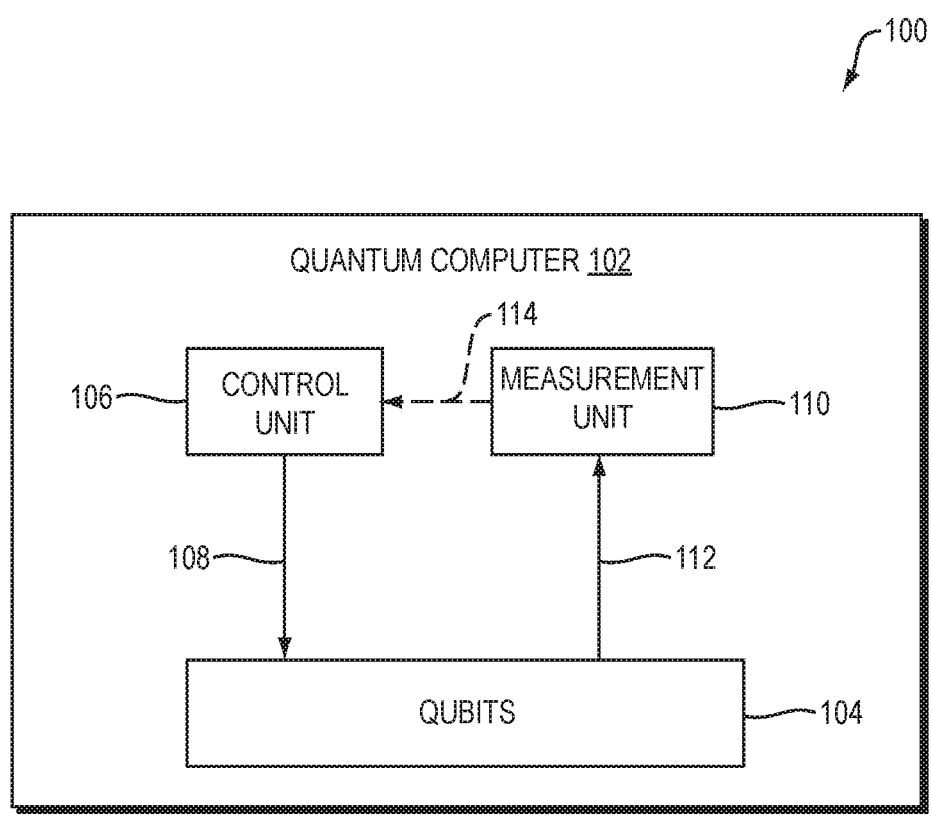
FIG. 1 is a diagram of a quantum computer according to one embodiment of the present invention.

Embodiments of the present invention apply a general technique that targets a circuit (or family of circuits) used for state preparation of a quantum computer and attempts to find a reduced-depth circuit for preparing the same states. In other words, embodiments of the present invention may receive, as an input, a first circuit (or a description of such a circuit) which is adapted to prepare an initial state of a quantum computer. The first circuit has a first depth $D_1$. Embodiments of the present invention generate a second circuit (or a description of such a circuit), based on the first circuit, which is also adapted to prepare an initial state of the quantum computer, and which has a second depth $D_2$. $D_2$ may be less than $D_1$.

A system includes a first circuit and a quantum autoencoder. The first circuit is adapted to prepare an initial state of a quantum computer, the first circuit has a first depth $D_1$ and a first fidelity $F_1$, and the first circuit is associated with a first cost function representing a cost $C_1$. The quantum autoencoder (i) receives as input the first circuit and generates, based on the first circuit, the second circuit having a second depth $D_2$ and associated with a second cost function representing a cost $C_2$, wherein $C_2$ is a value less than a value of $C_1$ or $D_2<D_1$ or both for the second circuit. The quantum autoencoder includes an encoder circuit producing a mapping from a manifold of the first circuit to a compressed latent space in the quantum autoencoder and a decoder circuit generating an approximate reproduction of the manifold of the first circuit. The quantum autoencoder includes functionality for generating, from the approximate reproduction of the manifold of the first circuit, the second circuit.

The method includes receiving, by a quantum autoencoder, as input, a first circuit adapted to prepare an initial state of a quantum computer, the first circuit having a first depth $D_1$, the first circuit associated with a first cost function representing a cost $C_1$, such as a first fidelity $F1$ of a first output state of the first circuit compared to a reference state. With the first circuit, the quantum autoencoder may receive a manifold or a description of the first circuit; alternatively, the manifold is the description of the first circuit. The method includes generating, by the quantum autoencoder, based on the first circuit, the second circuit having a second depth $D_2$ and associated with a second cost function representing a cost $C_2$, wherein $C_2$ is a value less than a value of $C_1$ or $D_2<D_1$ or both for the second circuit. The second cost function may represent a second fidelity $F_2$ of a second output state of the first circuit compared to the reference state, wherein $F_1<F_2$. The generating of the second circuit includes producing, by an encoder circuit of the quantum autoencoder, a mapping from a manifold of the first circuit to a compressed latent space in the quantum autoencoder, generating, by a decoder circuit of the quantum autoencoder, an approximate reproduction of the manifold of the first circuit, and generating, by the quantum autoencoder the second circuit, based on the approximate reproduction of the manifold of the first circuit. As will be understood by those of ordinary skill in the art, a manifold A is "an approximate reproduction" of a manifold B if A is expressive enough so that, for any state in the manifold B, some state in manifold A can be sent through a decoder circuit to approximate the target state of the first circuit. The quantum autoencoder may provide the second circuit for use in preparing at least one state of a quantum computer. Embodiments of the present invention may perform this process automatically (i.e., without human intervention).

In some embodiments, the quantum autoencoder generates not just one second circuit but a plurality of circuits based on the first circuit. For example, the quantum autoencoder may generate a third circuit having a third depth $D_c$ and associated with a third cost function representing a cost $C_3$. Continuing with this example, at least one of the second circuit and the third circuit may have a depth less than the depth of the first circuit or a cost function having a value less than a value of the cost function of the first circuit or both lower depth and lower cost. Continuing with this example, at least one of the second circuit and third circuit may have a higher level of fidelity than the level of fidelity of the first circuit. At least one of the generated circuits may have a depth less than the depth of the first circuit. At least one of the generated circuits may have a cost function having a value less than a value of the cost function of the first circuit. At least one of the generated circuits may have a higher level of fidelity than the level of fidelity of the first circuit.

Before receiving the first circuit, the quantum autoencoder undergoes a training process in which the encoder circuit and the decoder circuit are trained with a target parameterized circuit to optimize average fidelity of a plurality of training states. Training may include executing a "trash state" training algorithm—that is, the training is accomplished by maximizing the fidelity of the reference or "trash" state since it is possible, by training only on that trash state, to accomplish the learning task of finding a set of unitary operators acting on a set of qubits with a set of parameters defining a unitary quantum circuit (e.g., the unitary operators that preserve the quantum information of the input through a smaller, intermediate latent space). Benefits of implementing such a training algorithm include that there is no need to measure the input state (which can be complicated to do), a shorter-depth circuit can be used for trash state training than conventional training, and that the measurement of the trash state can be measured on whatever basis is most convenient.

Training may include iterative training. For example, training may include training a first subset of the encoder circuit to reduce the latent space by a single qubit (e.g., one qubit less than a number of qubits in the first circuit). Training may include iteratively training a second subset of the encoder circuit to reduce the latent space by a single qubit. In this way, the training optimizes the encoder circuit of the quantum autoencoder to prepare at least a second circuit (if not a plurality of circuits) that have fewer qubits, and lower circuit depth, than the circuit input to the quantum autoencoder. Training may also include selecting, based on data associated with the target parameterized circuit, a cost function with at least one property adapted for optimizing the quantum autoencoder circuits. Training may also include selecting, based on data associated with the manifold, a cost function with at least one property adapted for optimizing the quantum autoencoder circuits.

The procedure just described is referred to herein as the Compressed Unsupervised State Preparation (CUSP) procedure, process, or protocol. CUSP is intended to incrementally constrain a state or a set of states to a target manifold. CUSP uses an initial state preparation, together with a quantum autoencoder, to produce a mapping from the original manifold to a compressed latent space. The decoder circuit from the autoencoder is then used as a generative model to approximately reproduce the manifold. An optional final step attempts to refine the circuit parameters to improve the state preparation. The CUSP procedure may be performed, for example, on a quantum simulator as well, particularly when the original state preparation circuit is already too deep to be implemented on hardware, potentially enabling an experiment that could not have otherwise taken place.

In summary, a quantum autoencoder may be used in a way specified by the CUSP procedure to create shorter quantum circuits whose fidelity is greater and/or whose cost function has a lower value and/or whose depth is lower than the circuit on which it was trained. Another example of a cost function is the expectation value of an observable or linear combination of observables, e.g., the expectation value of the Hamiltonian corresponding to the energy.

Formally, the CUSP protocol takes as input a set of k training states from some parameterized family F and returns a circuit which, when applied to an initialization of the quantum computer, prepares states from the parameterized family. The parameter vector in the returned circuit may be thought of as either a manifold of physical states (e.g. derived from the set of ground states of a Hamiltonian, as in VQE) or directly as the parameters corresponding to the quantum circuit, which prepares the state.

Note that if the parameterized family is zero-dimensional (i.e., the parameter vector consists of just a single parameter setting), or equivalently when k=1, the CUSP protocol is simpler than when k>1, but the following description will still refer to such circuits as "parameterized" with the understanding that they are only trivially so, and will only bring up the distinction when there are notable considerations. Furthermore, any of a variety of circuit compilation techniques may be applied during or after the completion of the CUSP protocol. For example, any of a variety of circuit compilation techniques may be used to compile the circuit that is output by the CUSP protocol.

For clarity, the following description uses an example of ground states prepared using VQE. Note, however, that the use of VQE is merely an example and does not constitute a limitation of the present invention. Embodiments of the present invention may be used in connection with ground states prepared using methods other than VQE. The CUSP protocol is an entirely general one, and may be applied to other families of quantum states, including ones that represent the output states of arbitrary parameterized circuits.

Embodiments of the CUSP protocol may, for example, include the following three or four phases (also referred to herein as "stages"): (1) training set preparation; (2) autoencoder training; (3) generative model search; and (4) (optional) refinement.

More specifically, phase 1 (training set preparation) may include the following. The target parameterized circuit and the desired k training states are selected for use as inputs to the CUSP protocol. Although the target parameterized circuit and training states may be selected in any of a variety of ways, it may be useful in selecting these inputs to consider the fidelity or quality of these states and how that metric is measured, as these quantities will be needed for comparison throughout the CUSP protocol. For example, VQE uses expectation values that correspond to a ground state energy as a quality metric. The circuit parameters for preparation of these states are saved for use in the next stage.

Phase 2 (autoencoder training) may include the following. The quantum autoencoder (QAE) circuit may be trained in any of a variety of ways, such as by using "trash state" training, although trash state training may be performed with some exceptions and caveats. For example, an appropriate circuit may be chosen that is conducive to running on the architecture of the target hardware's quantum processor. Because the CUSP protocol does not require any specific type of gate sequence, it can be utilized on any gate-model quantum architecture, including but not limited to superconducting xmon or transmon computers, optical quantum computers, ion-traps, and so on. It may be beneficial to choose a circuit that has gates which utilize the same connectivity as the target hardware.

One caveat to the use of trash state training is related to the difficulty of training circuit parameters in a variational circuit. There are several ways to avoid this pitfall, such as, but not limited to, any one or more of the following in any combination:

Iteratively decrease the latent space: Rather than attempting to train the entire circuit at once, a subset of circuit elements may be trained to reduce the latent space by, e.g., a single qubit at a time. If the circuit that disentangles the i-th qubit is denoted as Ui, then the overall circuit reducing the latent space by n qubits simply becomes $U_{AE} = U_n \ldots U_2 U_1$.

Informed initial guess: The initial settings of the autoencoder circuit $U_{AE}$ could have some known setting which is close enough to the desired state that optimization from the initial setting is practicable.

Cost function design: If enough is known about the target state or manifold, another cost function may be substituted that has properties amenable to the optimization task.

Finally, the classical algorithm which governs the optimization of the circuit may be performed using any of a variety of numerical optimization methods. The success of these methods, however, may vary wildly across different manifolds and circuits, which should be taken into account.

The output of stage 2 is an encoder $U_{AE}$ (which immediately implies a complementary decoder unitary $U_{AE}^\dagger$) that optimizes the average fidelity of the k training states through the autoencoder network.

Phase 3 (generative model search) finds a parameterization of the quantum circuit in the latent space which is sufficient to prepare states in the training set, ideally generalizing to the entire linear span of the training set. In other words, phase 3 involves optimizing the circuit parameters relative to the cost function which determines the quality of the states that are prepared.

Note that for a particular circuit, there may be multiple ways to determine the quality of the prepared states. The available methods will largely depend on the algorithmic purpose of the states in question. For instance, in VQE, a series of measurements corresponds to some electronic energy which is then minimized. (Alternatively, the electronic energy may be maximized, such as by minimizing the negative of the electronic energy.) In general, one could use fidelity or state tomography to measure the quality. In stage 3, one may also consider metrics that average over new examples of states not in the original training set, but which correspond to other states on the desired manifold.

Because the QAE-decoded state preparation should by design have shorter gate depth than the original circuit, it may be possible in some instances to tune the parameters of the decoding unitary $U_{AE}^{\dagger}$ as well as the latent space unitary $G(\vec{\theta})$ to optimize the precision of the output state to the target state. Such tuning is performed (optionally) in phase 4. Such tuning is possible because the noise inherent in applying the original state preparation circuit may have introduced errors in the parameters of the autoencoder circuit during training. Hence, if the metric for measuring the quality of the state does not re-use the original state preparation circuit, then these errors might be removed by a final refinement of the autoencoder and latent space circuit parameters.

One aspect of the present invention is directed to a quantum computing method for approximating a target quantum state. The quantum computing method includes forming a reduced-depth quantum-state generator by combining a decoder of a quantum autoencoder with a compressed-state generator; the quantum autoencoder being trained such that (i) an encoder of the quantum autoencoder compresses each of a plurality of training states into a corresponding compressed state, and (ii) the decoder decompresses the corresponding compressed state to approximate its corresponding training state; and the compressed-state generator being configurable such that the reduced-depth quantum-state generator rotates a reference state into an output approximating the target quantum state.

The quantum computing method may further include generating, with the reduced-depth quantum-state generator, the output approximating the target quantum state. Said generating the output approximating the target quantum state may include: rotating, with the compressed-state generator, the reference state into an intermediate compressed state corresponding to the target quantum state; and transforming, with the decoder, the intermediate compressed state into the output approximating the target quantum state. The quantum computing method may further include configuring the compressed-state generator to rotate the reference state into the intermediate compressed state. The quantum computing method may further include running a variational quantum eigensolver with the output approximating the target quantum state.

Each of the plurality of training states and the output state may be encoded in a first number of qubits of a quantum computer; and each of the compressed states and the intermediate compressed state may be encoded in a second number of qubits less than the first number of qubits. Each of the compressed-state generator and the decoder may be synthesized on the quantum computer with a number of gates scaling no more than polynomially with the second number of qubits. Each of the compressed-state generator and the decoder implementing single-qubit rotations and controlled one-qubit rotations may be among the second number of qubits. Each of the compressed-state generator and the decoder may implement a two-qubit gate for every pair of the second number of qubits. Each of the qubits may be one of a superconducting qubit, a trapped-ion qubit, and a quantum dot qubit.

The quantum computing method may further include training the quantum autoencoder with the plurality of training states. The decoder may be an inverse of the encoder. Said training the quantum autoencoder may include optimizing a plurality of encoder parameters such that the encoder of the quantum autoencoder, configured according to the encoder parameters, minimizes a cost function. The cost function may depend on fidelity between a trash state outputted by the encoder and a trash reference state. Said optimizing the plurality of encoder parameters may include iteratively: configuring the encoder according to the encoder parameters; obtaining a plurality of fidelity values by generating each of the training states, transforming said each of the training states with the encoder, and measuring the fidelity between the trash state and the trash reference state; updating an output of the cost function based on the fidelity values; and updating the encoder parameters, with an optimization algorithm running on a classical computer, based on the updated output of the cost function; until the cost function has converged. Said measuring the fidelity of the trash state may include: generating the trash reference state; and applying a SWAP test to the trash state and the trash reference state. Said training the autoencoder may include generating each of the training states with at least one training-state generator that rotates the reference state into said each of the training states. A depth of the reduced-depth quantum-state generator may be less than a depth of the training-state generator.

The quantum computing method may further comprise determining, for each of the compressed states, a generator parameter set such that the compressed-state generator, configured according to the generator parameter set, rotates the reference state into said each of the compressed states. A size of each generator parameter set may scale no more than polynomially with a number of qubits used to encode each of the compressed states. Said determining, for each of the compressed states, the generator parameter set may include optimizing the generator parameter set to minimize a cost function. The cost function may depend on fidelity between an output of the compressed-state generator and said each of the compressed states. Said optimizing the generator parameter set may include, iteratively: configuring the compressed-state generator according to the generator parameter set corresponding to said each of the compressed states; transforming the reference state with the compressed-state generator; measuring the fidelity between the output of the compressed-state generator and said each of the compressed states; updating an output of the cost function based on the fidelity; and updating the generator parameter set, with an optimization algorithm running on a classical computer, based on the updated output of the cost function; until the cost function has converged. Said measuring the fidelity may include: generating said each of the compressed states; and applying a SWAP test to the output of the compressed-state generator and said each of the compressed states. Said generating said each of the compressed states may include generating said each of the compressed states with the encoder of the quantum autoencoder.

The quantum computing method may further include optimizing, after said forming the reduced-depth quantum-state generator, a plurality of decoder parameters such that the decoder, configured according to the decoder parameters, to minimize a cost function. The cost function may depend on fidelity between the target quantum state and the output of the reduced-depth quantum-state generator. Said optimizing the decoder parameters may includes, iteratively: configuring the decoder according to the decoder parameters; generating the output of the reduced-depth quantum-state generator; measuring the fidelity between the target quantum state and the output of the reduced-depth quantum-state generator; updating an output of the cost function based on the fidelity; and updating the decoder parameters, with an optimization algorithm running on a classical computer, based on the updated output of the cost function; until the cost function has converged.

Another aspect of the present invention is directed to a quantum computing method for approximating a target quantum state, including: rotating, with a compressed-state generator, a reference state into an intermediate compressed state corresponding to the target quantum state; and transforming, with a decoder of a quantum autoencoder, the intermediate compressed state into an output approximating the target quantum state.

The quantum computing method may further include configuring the compressed-state generator, according to one or more generator parameter sets, to rotate the reference state into the intermediate compressed state. The quantum computing method may further include running a variational quantum eigensolver with the output of the decoder.

Yet another aspect of the present invention is directed to a hybrid quantum-classical computing system for reduced-depth quantum-state generation, including: a quantum computer having a plurality of qubits and a qubit controller that manipulates the plurality of qubits; and a classical computer storing machine-readable instructions that, when executed by the classical computer, control the classical computer to cooperate with the quantum computer to: form, with the plurality of qubits, a reduced-depth quantum-state generator by combining a decoder of a quantum autoencoder with a compressed-state generator; the quantum autoencoder being trained such that (i) an encoder of the quantum autoencoder compresses each of a plurality of training states into a corresponding compressed state, and (ii) the decoder decompresses the corresponding compressed state to approximate its corresponding training state; and the compressed-state generator being configurable such that the reduced-depth quantum-state generator rotates a reference state into an output approximating the target quantum state.

The machine-readable instructions may, when executed by the classical computer, control the classical computer to cooperate with the quantum computer to generate, with the reduced-depth quantum-state generator, the output approximating the target quantum state. The machine-readable instructions may include machine-readable instructions to: rotate, with the compressed-state generator, the reference state into an intermediate compressed state corresponding to the target quantum state; and transform, with the decoder, the intermediate compressed state into the output approximating the target quantum state. The machine-readable instructions may, when executed by the classical computer, control the classical computer to cooperate with the quantum computer to configure the compressed-state generator to rotate the reference state into the intermediate compressed state. The machine-readable instructions may, when executed by the classical computer, control the classical computer to cooperate with the quantum computer to run, on the quantum computer, a variational quantum eigensolver with the output approximating the target quantum state.

Each of the plurality of training states and the output state may be encoded in a first number of the qubits; and each of the compressed states and the intermediate compressed state may be encoded in a second number of the qubits less than the first number. Each of the compressed-state generator and the decoder may be synthesized on the quantum computer with a number of gates scaling no more than polynomially with the second number of the qubits. Each of the compressed-state generator and the decoder may implement single-qubit rotations and controlled one-qubit rotations among the second number of the qubits. Each of the compressed-state generator and the decoder may implement a two-qubit gate for every pair of the second number of the qubits. Each of the qubits may be one of a superconducting qubit, a trapped-ion qubit, and a quantum dot qubit.

The machine-readable instructions may, when executed by the classical computer, control the classical computer to cooperate with the quantum computer to train the quantum autoencoder with the plurality of training states. The decoder may be an inverse of the encoder. The machine-readable instructions may include machine-readable instructions to optimize a plurality of encoder parameters such that the encoder of the quantum autoencoder, configured according to the encoder parameters, minimizes a cost function. The cost function may depend on fidelity between a trash state outputted by the encoder and a trash reference state. The machine-readable instructions may include machine-readable instructions to, iteratively: configure the encoder according to the encoder parameters, obtain a plurality of fidelity values by generating each of the training states, transforming said each of the training states with the encoder, and measuring the fidelity between the trash state and the trash reference state, update an output of the cost function based on the fidelity values, and update the encoder parameters, with an optimization algorithm running on the classical computer, based on the updated output of the cost function, until the cost function has converged. The machine-readable instructions to measure the fidelity of the trash state may include machine-readable instructions to: generate the trash reference state, and apply a SWAP test to the trash state and the trash reference state. The machine-readable instructions may include machine-readable instructions to generate each of the training states with at least one training-state generator that rotates the reference state into said each of the training states. A depth of the reduced-depth quantum-state generator may be less than a depth of the training-state generator.

The classical computer may store machine-readable instructions that, when executed by the classical computer, control the classical computer to cooperate with the quantum computer to determine, for each of the compressed states, a generator parameter set such that the compressed-state generator, configured according to the generator parameter set, rotates the reference state into said each of the compressed states. A size of each generator parameter set may scale no more than polynomially with a number of the qubits used to encode each of the compressed states. The machine-readable instructions may include machine-readable instructions to optimize the generator parameter set to minimize a cost function. The cost function may depend on fidelity between an output of the compressed-state generator and said each of the compressed states. The machine-readable instructions may optimize the generator parameter set includes machine-readable instructions to, iteratively: configure the compressed-state generator according to the generator parameter set corresponding to said each of the compressed states, transform the reference state with the compressed-state generator, measure the fidelity between the output of the compressed-state generator and said each of the compressed states, update an output of the cost function based on the fidelity, and update the generator parameter set, with an optimization algorithm running on the classical computer, based on the updated output of the cost function, until the cost function has converged. The machine-readable instructions may include instructions to: generate said each of the compressed states, and apply a SWAP test to the output of the compressed-state generator and said each of the compressed states. The machine-readable instructions may include machine-readable instructions to generate said each of the compressed states with the encoder of the quantum autoencoder.

The machine-readable instructions may, when executed by the classical computer, control the classical computer to cooperate with the quantum computer to optimize, after forming the reduced-depth quantum-state generator, a plurality of decoder parameters such that the decoder, configured according to the decoder parameters, minimizes a cost function. The cost function may depend on fidelity between the output of the reduced-depth quantum-state generator and the target quantum state. The machine-readable instructions may include machine-readable instructions to, iteratively: configure the decoder according to the decoder parameters, generate the output of the reduced-depth quantum-state generator, measure the fidelity between the target quantum state and the output of the reduced-depth quantum-state generator, update an output of the cost function based on the fidelity, and update the decoder parameters, with an optimization algorithm running on the classical computer, based on the updated output of the cost function, until the cost function has converged.

Another aspect of the present invention is directed to a hybrid quantum-classical computing system for reduced-depth quantum-state generation, including: a quantum computer having a plurality of qubits and a qubit controller that manipulates the plurality of qubits; and a classical computer storing machine-readable instructions that, when executed by the classical computer, control the classical computer to cooperate with the quantum computer to: rotate, with a compressed-state generator, a reference state into an intermediate compressed state corresponding to the target quantum state; and transform, with a decoder of a quantum autoencoder, the intermediate compressed state into an output approximating the target quantum state.

The machine-readable instructions may, when executed by the classical computer, control the classical computer to cooperate with the quantum computer to configure the compressed-state generator, according to one or more generator parameter sets, to rotate the reference state into the intermediate compressed state. The machine-readable instructions may, when executed by the classical computer, control the classical computer to cooperate with the quantum computer to run a variational quantum eigensolver with the output of the decoder.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
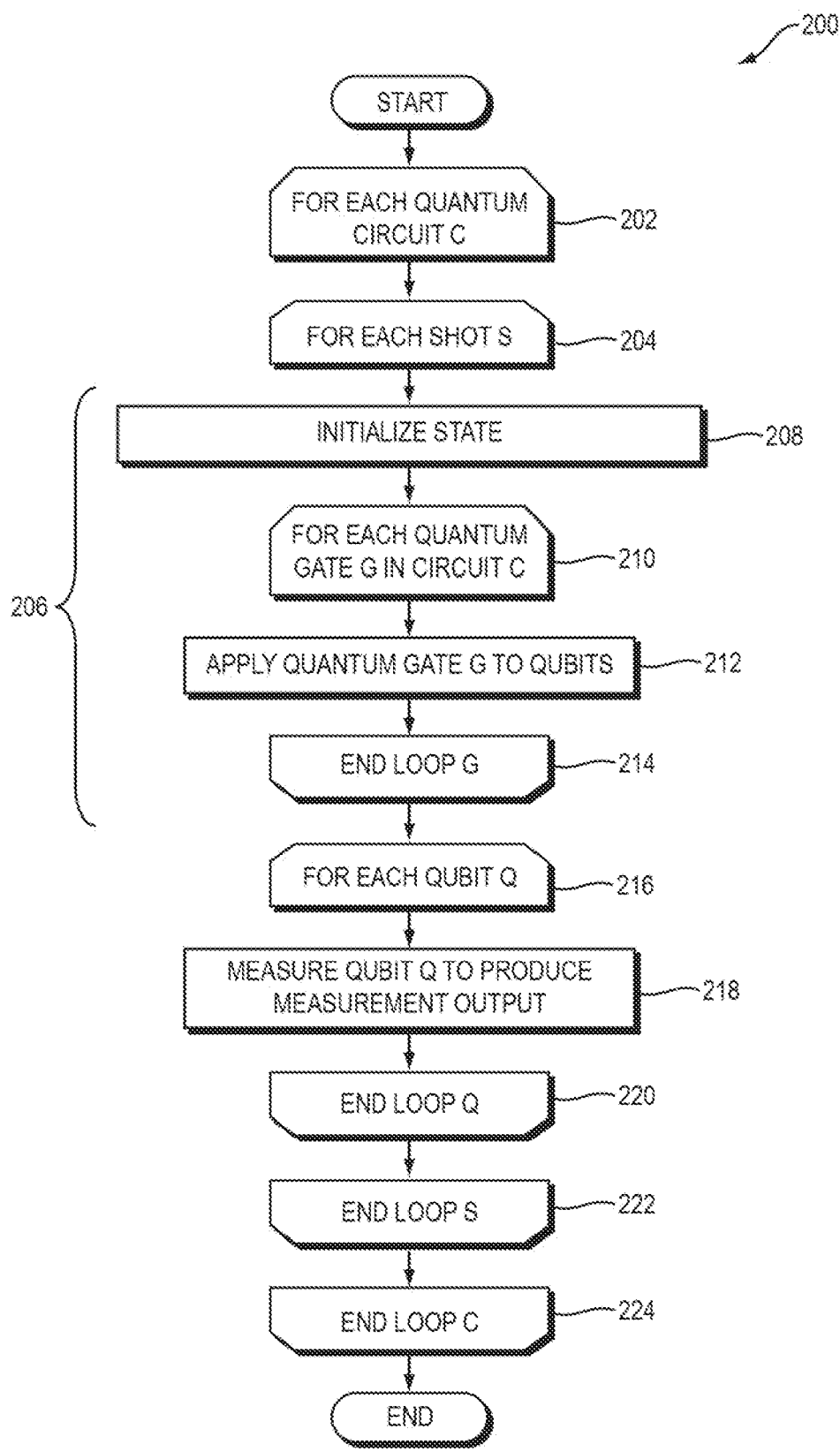
FIG. 2A is a flowchart of a method performed by the quantum computer of FIG. 1 according to one embodiment of the present invention.
Figure 2B:
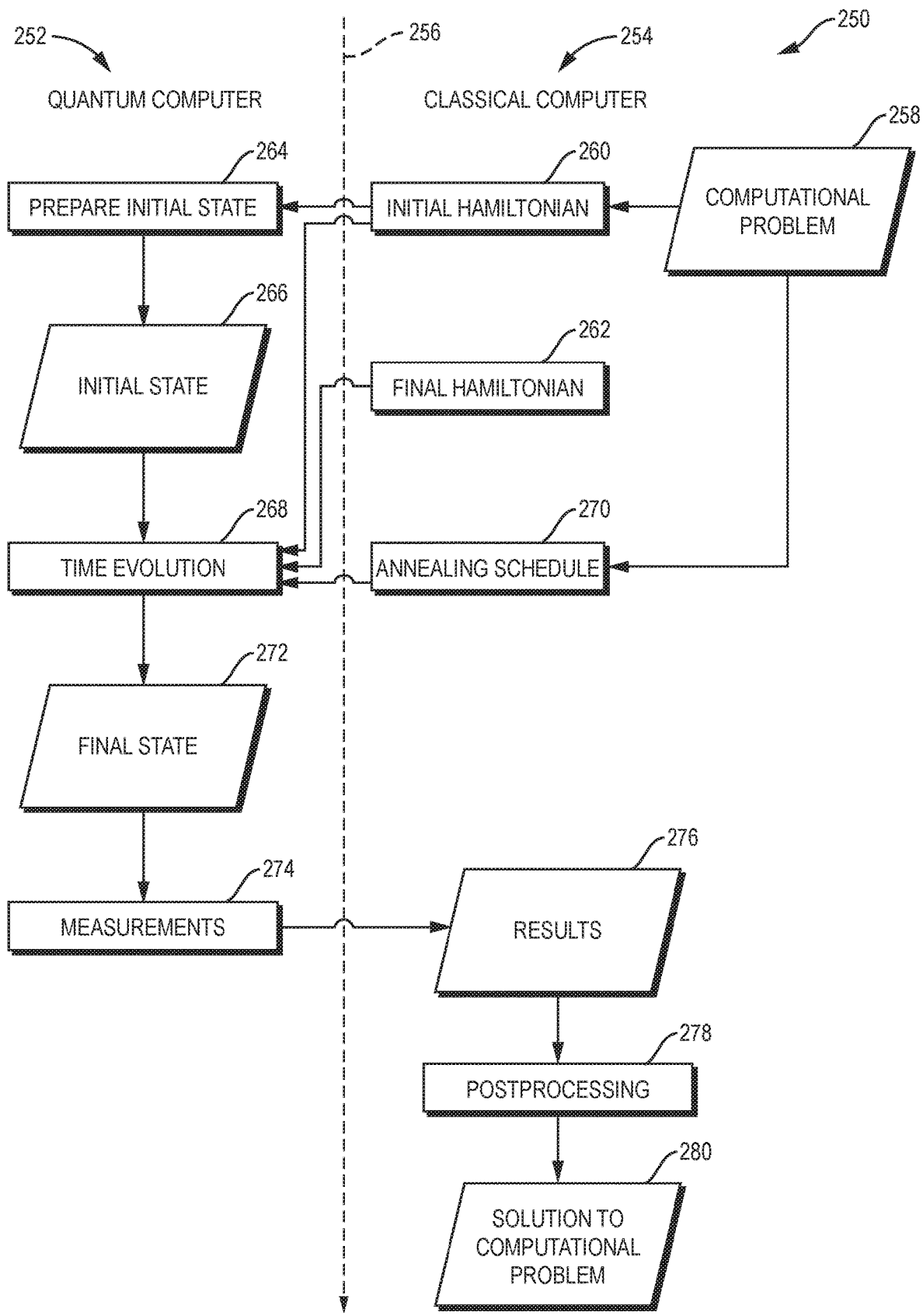
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original computational problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signals 114 from the measurement unit 110 to the control unit 106. Such feedback signals 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, operation 206). A special case of state preparation is "initialization," also referred to as a "reset operation," in which the initial state is one in which some or all of the qubits 104 are in the "zero" state i.e., the default single-qubit state (FIG. 2, operation 208). More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A as elements of "state preparation" may instead be characterized as elements of gate application. Conversely, for example, some or all of the components and operations that are illustrated in FIGS. 1 and 2A as elements of "gate application" may instead be characterized as elements of state preparation. As one particular example, the system and method of FIGS. 1 and 2A may be characterized as solely performing state preparation followed by measurement, without any gate application, where the elements that are described herein as being part of gate application are instead considered to be part of state preparation. Conversely, for example, the system and method of FIGS. 1 and 2A may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
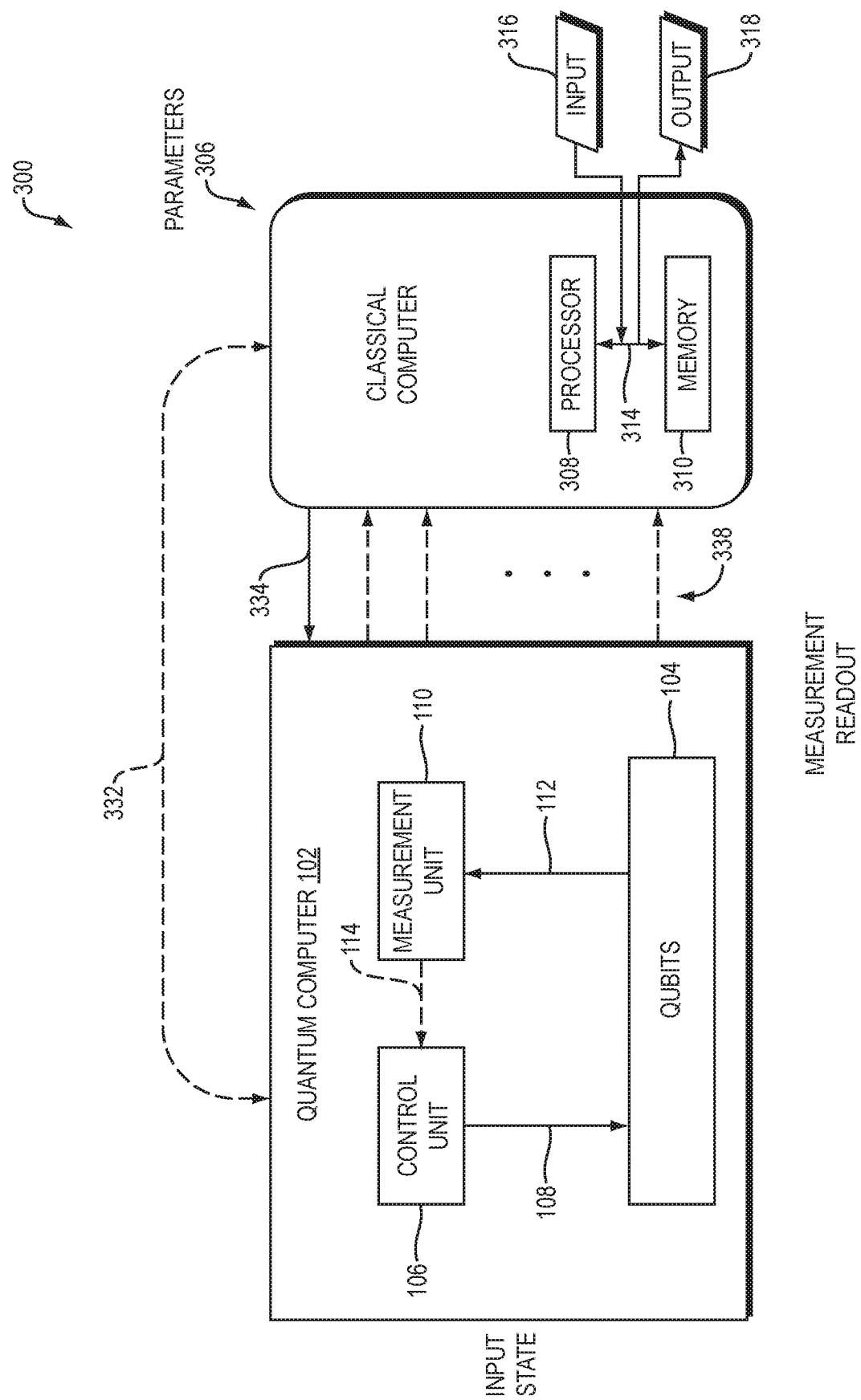
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Figure 4:
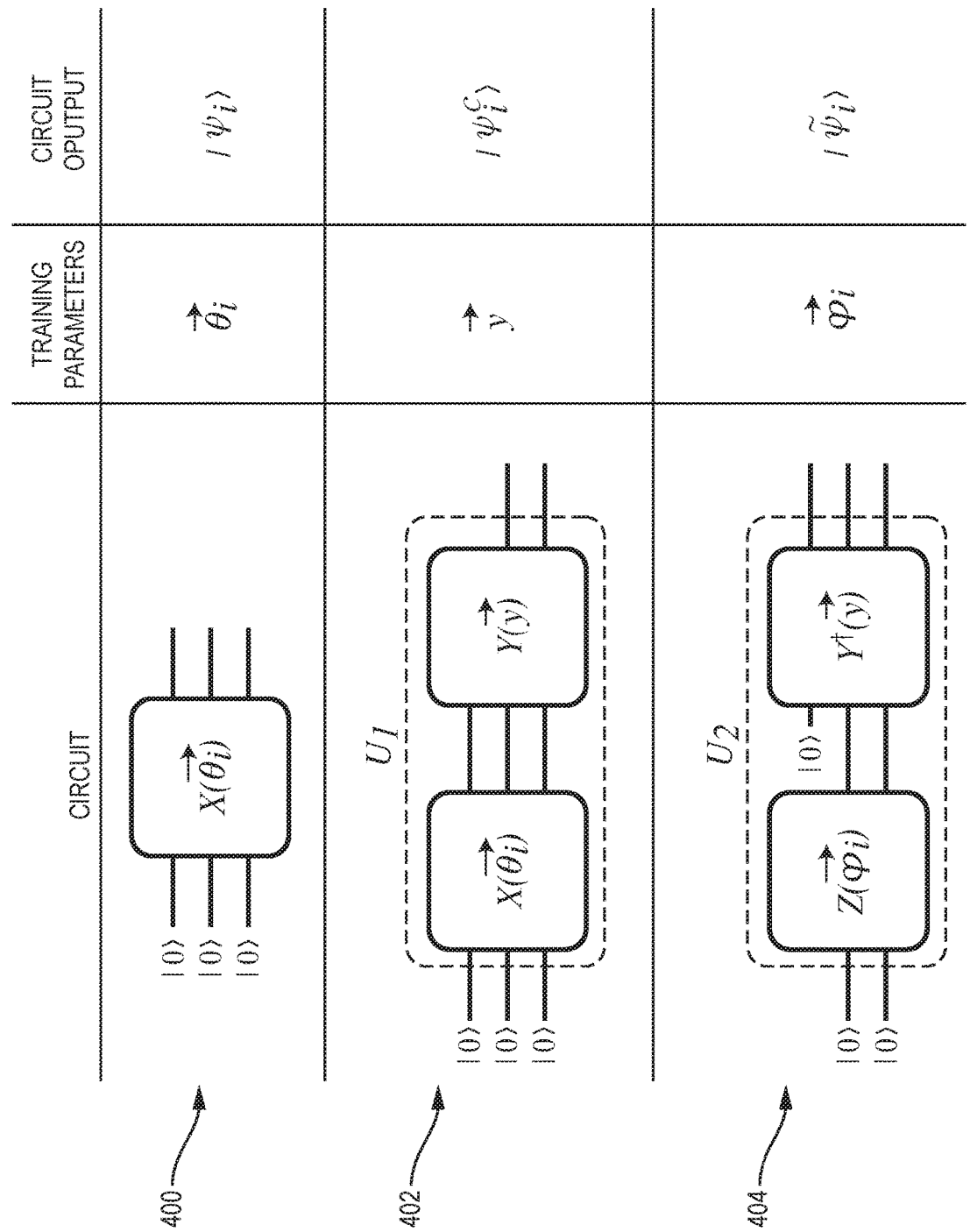
FIG. 4 shows three quantum circuit diagrams illustrating operation of embodiments herein, in embodiments.

FIG. 4 shows three quantum circuit diagrams illustrating operation of embodiments herein. In a first quantum circuit 400, a training-state generator X implements a unitary transformation that rotates an n-qubit reference state $|000\ldots\rangle$ into an n-qubit training state $|\psi_i\rangle$. The training-state generator X is configured according to a parameter vector $\vec{\theta}_i$ such that $|\psi_i\rangle = X(\vec{\theta}_i)|000\ldots\rangle$. Here, i indexes the training states such that each training state $|\psi_i\rangle$ has a corresponding parameter vector $\vec{\theta}_i$. The parameter vectors $\vec{\theta}_i$ may be determined via training, as described in more detail below. For clarity in FIG. 4, the reference state and training states are shown as 3-qubit states (i.e., n=3). However, the training-state generator X may be synthesized to operate on any number of qubits without departing from the scope hereof.

In a second quantum circuit 402 of FIG. 4, the training-state generator X is combined with an encoder Y of a quantum autoencoder. Encoder Y implements a bijective mapping (i.e., one-to-one) that compresses each training state $|\psi_i\rangle$ into a corresponding s-qubit compressed state $|\psi_i^c\rangle$ that it is encoded with fewer qubits than the corresponding training state $|\psi_i\rangle$. That is, s is less than n. Thus, in the example of FIG. 4, each compressed state $|\psi_i^c\rangle$ is a two-qubit state (i.e., s=2). However, s may have any other value, less than n, without departing from the scope hereof.

Second quantum circuit 402 is used to train encoder Y using classical machine-learning techniques. More specifically, this training identifies a decoder parameter vector $\vec{y}$ such that $|\psi_i^c\rangle = Y(\vec{y})|\psi_i\rangle$ for all i. This training may be implemented as a halfway training scheme, as shown in FIG. 4, or as a full training scheme with a corresponding decoder of the quantum autoencoder.

In a third quantum circuit 404 of FIG. 4, a compressed-state generator Z is combined with the decoder $Y^\dagger$ of the quantum autoencoder to form a reduced-depth quantum-state generator $U_2$. The compressed-state generator Z implements a unitary transformation that rotates an s-qubit reference state $|000\ldots\rangle$ into each compressed state $|\psi_i^c\rangle$ based on a parameter vector That is, the parameter vector $\vec{\varphi}_i$ is selected, for each i, such that $|\psi_i^c\rangle = Z(\vec{\varphi}_i)|000\ldots\rangle$. The parameter vectors $\vec{\varphi}_i$ may be obtained via training with classical machine-learning techniques, as described in more detail below.

The decoder $Y^\dagger$ of third quantum circuit 404 is the inverse of the encoder Y of second quantum circuit 402, and thus can be determined from the encoder Y when trained via halfway training. Alternatively, the decoder $Y^\dagger$ can be obtained directly from the quantum autoencoder, when trained via full training. In either case, the decoder $Y^\dagger$, when configured according to the decoder parameter vector $\vec{y}$, bijectively transforms each s-qubit compressed state $|\psi_i^c\rangle$ into a corresponding n-qubit output state $|\tilde\psi_i\rangle$ that approximates the corresponding training state $|\psi_i\rangle$, i.e., $|\tilde\psi_i\rangle = Y^\dagger(\vec{y})|\psi_i^c\rangle \approx |\psi_i\rangle$ for all L To transform between qubit spaces of different dimension, the decoder $Y^\dagger$ also accepts an (n−s)-qubit reference state as part of its input.

Figure 5:
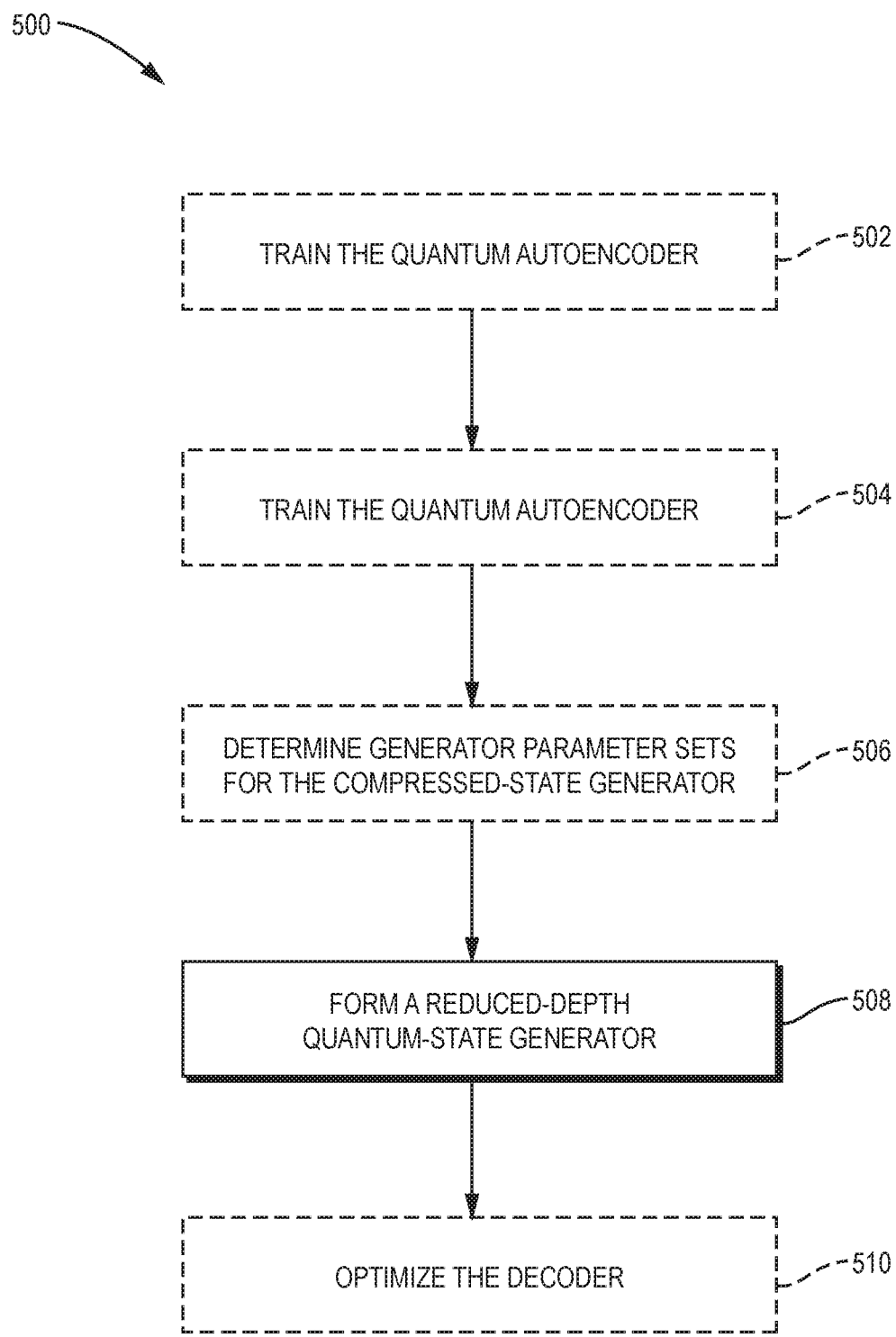
FIG. 5 is a flow chart illustrating a quantum computing method for approximating a target quantum state, in embodiments.

FIG. 5 is a flow chart illustrating a quantum computing method 500 for approximating a target quantum state. Method 500 may be implemented, for example, with HQC 300 of FIG. 3. Method 500 includes a step 508 to form a reduced-depth quantum-state generator by combining a decoder of a quantum autoencoder with a compressed-state generator. The quantum autoencoder is trained such that (i) an encoder of the quantum autoencoder compresses each of a plurality of training states into a corresponding compressed state, and (ii) the decoder decompresses the corresponding compressed state to approximate its corresponding training state. Furthermore, the compressed-state generator is configurable such that the reduced-depth quantum-state generator rotates a reference state into an output approximating the target quantum state.

In one example of step 508, the compressed-state generator $Z(\vec{\varphi}_i)$ of FIG. 4 is combined with the decoder $Y^\dagger(\vec{y})$ to form the reduced-depth quantum-state generator $U_2$. Each of the plurality of training states and the output may be encoded in a first number of qubits of a quantum computer (e.g., qubits 104 of FIGS. 1 and 3), and each of the compressed states may be encoded in a second number of qubits less than the first number of qubits. In the example of FIG. 4, each training state $|\psi_i\rangle$ and each output state $|\tilde\psi_i\rangle$ is encoded in n=3 qubits, and each compressed state $|\psi_i^c\rangle$ is encoded in s=2 qubits.

In some embodiments of quantum computing method 500, each of the compressed-state generator and the decoder is synthesized on the quantum computer (e.g., quantum computer component 102 of FIGS. 1 and 3) with a number of gates scaling no more than polynomially with the second number of qubits. The compressed-state generator and the decoder may each be reduced to a set of universal quantum gates for execution on the quantum computer. For example, the set of universal quantum gates may include single-qubit rotations and controlled one-qubit rotations among the second number of qubits. Alternatively, the universal set of quantum gates may include a two-qubit gate for every pair of the second number of qubits.

In other embodiments, quantum computing method 500 includes a step 504 to train the quantum autoencoder with the plurality of training states. Step 504 may be implemented by optimizing a plurality of encoder parameters such that the encoder of the quantum autoencoder, configured according to the encoder parameters, minimizes a cost function. In some of these embodiments, the cost function depends on fidelity between a trash state outputted by the encoder and a trash reference state. In the example of FIG. 4, the encoder parameters are represented by the parameter vector $\vec{y}$.

In some embodiments of step 504, the plurality of encoder parameters is optimized by iteratively (i) configuring the encoder according to the encoder parameters, (ii) obtaining a plurality of fidelity values by generating each of the training states, transforming said each of the training states with the encoder, and measuring the fidelity between the trash state and the trash reference state, (iii) updating an output of the cost function based on the fidelity values, and (iv) updating the encoder parameters, with an optimization algorithm running on a classical computer, based on the updated output of the cost function. Step 504 stops iterating when the cost function has converged. The optimization algorithm may run, for example, on classical computer component 306 of FIG. 3. The fidelity of the trash state may be measured by generating the trash reference state, and applying a SWAP test to the trash state and the trash reference state.

In other embodiments, the cost function depends on another metric, such as an expectation value of a Hamiltonian corresponding to a ground-state energy of a quantum system (e.g., the $H_2$ molecule). The expectation value can alternatively be determined for a Hamiltonian corresponding to another type of energy (e.g., an excited state) or a quantum operator corresponding to a physical observable other than energy. Alternatively, the metric may be fidelity of the encoder output relative to a state different from the training states. The cost function may depend on a single metric or multiple metrics.

In some embodiments, method 500 includes a step 502 to generate each of the training states with at least one training-state generator that rotates the reference state into said each of the training states. A depth of the reduced-depth quantum-state generator may be less than a depth of the training-state generator. In one example of step 502, training-state generator $X(\vec{\theta}_i)$ of FIG. 4 is configured according to parameter vector $\vec{\theta}_i$ to rotate the n-qubit reference state $|000\ldots\rangle$ into the n-qubit training state $|\psi_i\rangle$.

In some embodiments, method 500 includes a step 506 to determine, for each of the compressed states, a generator parameter set such that the compressed-state generator, configured according to the generator parameter set, rotates the reference state into said each of the compressed states. The compressed-state generator may be synthesized such a size of each generator parameter set scales no more than polynomially with a number of qubits used to encode each of the compressed states. In one example of step 506, each generator parameter set is represented in FIG. 4 as the parameter vector $\vec{\varphi}_i$.

Step 506 may be implemented by optimizing each generator parameter set to minimize a cost function. The cost function may depend on fidelity between an output of the compressed-state generator and said each of the compressed states. Similar to the cost function described above with respect to step 504, the cost function may alternatively depend on a different metric, or multiple metrics, without departing from the scope hereof.

In some embodiments of step 506, each generator parameter set is optimized by iteratively (i) configuring the compressed-state generator according to the generator parameter set corresponding to said each of the compressed states, (ii) transforming the reference state with the compressed-state generator; (iii) measuring the fidelity between the output of the compressed-state generator and said each of the compressed states; (iv) updating an output of the cost function based on the fidelity; and (v) updating the generator parameter set, with an optimization algorithm running on a classical computer, based on the updated output of the cost function. Step 506 stops iterating when the cost function has converged. The optimization algorithm may run, for example, on classical computer component 306 of FIG. 3. The fidelity between the output of the compressed-state generator and said each of the compressed states may be measured by generating said each of the compressed states, and applying a SWAP test to the output of the compressed-state generator and said each of the compressed states. Each of the compressed states may be generated with the encoder of the quantum autoencoder (e.g., quantum circuit $Y(\vec{y})$ of FIG. 4).

In some embodiments, method 500 includes a step 510 to optimize, after said forming the reduced-depth quantum-state generator, a plurality of decoder parameters such that the decoder, configured according to the decoder parameters, minimizes a cost function. The cost function may depend on fidelity between the target quantum state and the output of the reduced-depth quantum-state generator. Alternatively, the cost function may depend on a different metric, or on several metrics. In one example of step 510, parameters $\vec{y}$ of the decoder $Y^\dagger(\vec{y})$ are updated, after being combined with the compressed-state generator $Z(\vec{\varphi}_i)$ to form the reduced-depth quantum-state generator $U_2$, to improve fidelity of the decoder output.

In some embodiments of step 510, the decoder parameters are optimized by iteratively (i) configuring the decoder according to the decoder parameters (ii) generating the output of the reduced-depth quantum-state generator, (iii) measuring the fidelity between the target quantum state and the output of the reduced-depth quantum-state generator, (iv) updating an output of the cost function based on the fidelity, and (v) updating the decoder parameters, with an optimization algorithm running on a classical computer, based on the updated output of the cost function. Step 510 stops iterating when the cost function has converged. The optimization algorithm may run, for example, on classical computer component 306 of FIG. 3.

Figure 6:
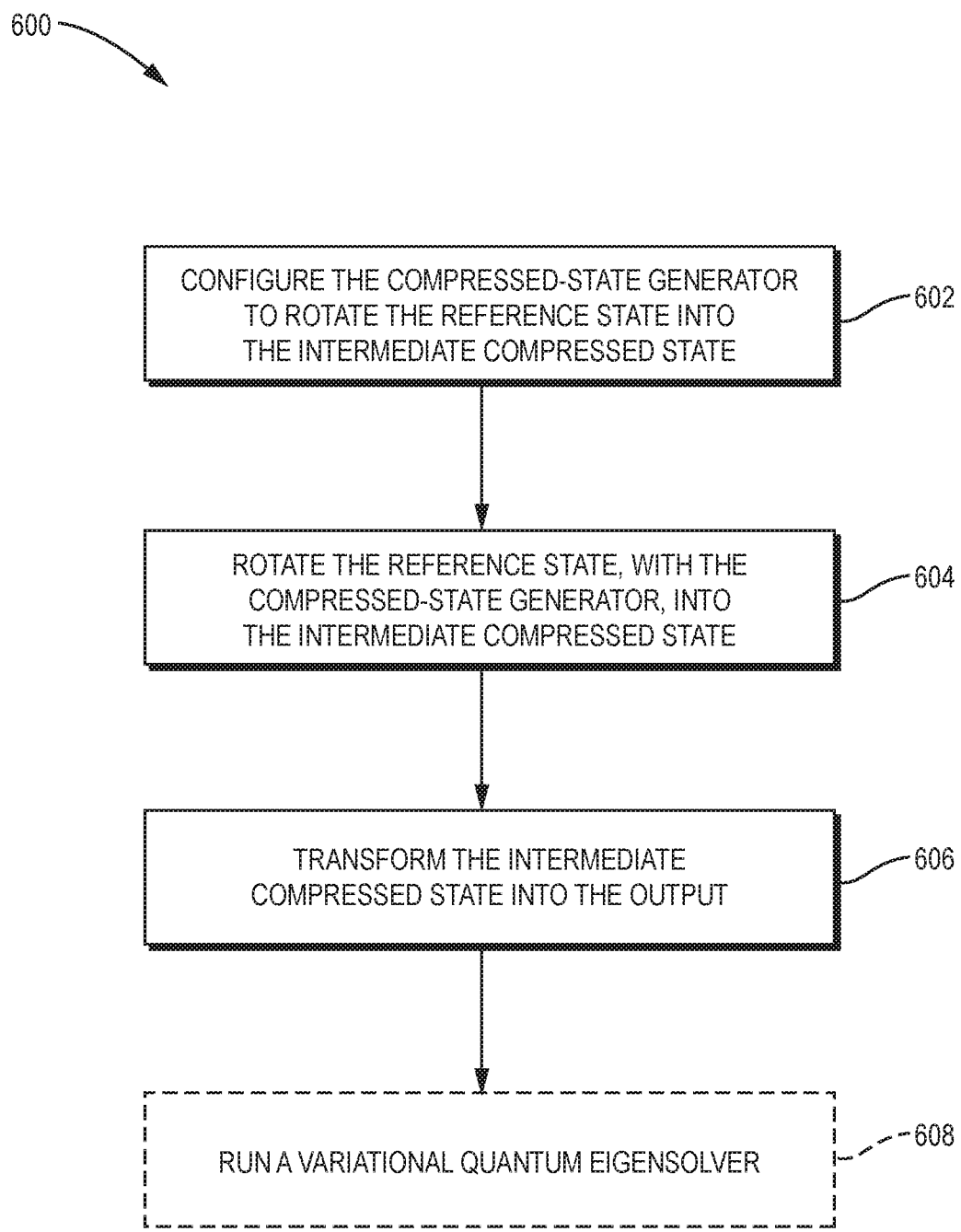
FIG. 6 is a flow chart illustrating a quantum computing method for approximating a target quantum state, in embodiments.

FIG. 6 is a flow chart illustrating a quantum computing method 600 for approximating a target quantum state. Method 600 may be implemented, for example, with HQC 300 of FIG. 3. Method 600 includes a step 604 to rotate, with a compressed-state generator, a reference state into an intermediate compressed state corresponding to the target quantum state. In one example of step 604, the compressed-state generator $Z(\vec{\varphi}_i)$ of FIG. 4 rotates the s-qubit reference state $|00 \ldots \rangle$ into an intermediate compressed state encoded in two qubits. Method 600 includes a step 606 to transform, with a decoder of a quantum autoencoder, the intermediate compressed state into an output approximating the target quantum state. In one example of step 606, the decoder $Y^\dagger(\vec{y})$ of FIG. 4 transforms the two-qubit output of the compressed-state generator $Z(\vec{\varphi}_i)$, with an additional ancillary qubit initialized to $|0\rangle$, into a three-qubit output state.

In some embodiments, method 600 further includes a step 602 to configure the compressed-state generator, according to one or more generator parameter sets, to rotate the reference state into the intermediate compressed state. In one example of step 602, the parameter vector $\vec{\varphi}_i$ of FIG. 4 is selected such that the three-qubit output of the decoder $Y^\dagger(\vec{y})$ approximates a target quantum state. The parameter vector $\vec{\varphi}_i$ may be selected according to the generator parameter sets determined in step 506 of method 500. For example, the parameter vector $\vec{\varphi}_i$ may be selected by interpolating between the generator parameter sets when the target quantum state is not equal to any of the training states.

In other embodiments, method 600 includes a step 608 to run a variational quantum eigensolver with the output of the decoder. In one example of step 608, the output of the decoder $Y_+(\vec{y})$ of the reduced-depth quantum-state generator $U_2$ is inputted to a variational quantum eigensolver implemented as a quantum circuit on HQC 300.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, generating a quantum circuit having either a lower depth or lower cost or both than an input quantum circuit cannot be done manually or mentally. Additionally, implementation of the methods and systems described herein may provide the practical application of initializing a state of one or more qubits in a quantum computer using a reduced-depth circuit.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A method for generating a reduced-cost circuit of a target circuit, the method comprising:
    generating, by a quantum autoencoder, based on a set of quantum states in a set of qubits output from the target circuit, a decoder circuit that acts on a subset of the set of qubits, a size of the subset being less than a size of the set of qubits;
    generating the reduced-cost circuit, the reduced-cost circuit comprising: (1) a new parameterized quantum circuit, the new parameterized quantum circuit having a set of parameters, acting only on the subset of the set of qubits, and (2) the decoder circuit,
    wherein generating the reduced-cost circuit comprises:
        training an encoder circuit and the decoder circuit to optimize the average fidelity of a plurality of training states, wherein training the encoder circuit comprises training a first and second subset of the set of qubits of the encoder circuit to reduce a latent space of the target circuit by at least one qubit; and
        receiving the set of quantum states generated by at least one quantum circuit, having a depth D1 and a first cost function having a first cost value C1; and
    training the reduced-cost circuit to act on the set of qubits as a generative model to reproduce the set of quantum states output from the target circuit, the reduced-cost circuit having a second depth D2 and being associated with a corresponding second cost function having a second cost value C2, wherein at least one of the following is true: (1) C2 is less than C1; and (2) D2 is less than D1.

2. The method of claim 1, wherein C2 is less than C1 and D2 is less than D1.

3. The method of claim 1, wherein C2 less than C1.

4. The method of claim 1, wherein D2 is less than D1.

5. The method of claim 1, wherein the first cost function calculates a first energy cost and wherein the second cost function calculates a second energy cost.

6. The method of claim 1, wherein the first cost function represents a first function of a first number of gates within a circuit and wherein the second cost function represents a second function of a second number of gates within the circuit.

7. The method of claim 1, wherein the first cost function represents a first fidelity F1 of a first output state of the decoder circuit compared to a reference state.

8. The method of claim 7, wherein the second cost function represents a second fidelity F2 of a second output state of the decoder circuit compared to the reference state, wherein F1<F2.

9. A system for generating a reduced-cost circuit of a target circuit, the system comprising:
    a quantum autoencoder (i) generating, based on a set of quantum states in a set of qubits output from the target circuit, a decoder circuit that acts on a subset of the set of qubits, a size of the subset being less than a size of the set of qubits; and
    a reduced-cost circuit generator generating the reduced-cost circuit, the reduced-cost circuit comprising: (1) a new parameterized quantum circuit, the new parameterized quantum circuit having a set of parameters, acting only on the subset of the set of qubits, and (2) the decoder circuit,
    wherein generating the reduced-cost circuit comprises:
        training an encoder circuit and the decoder circuit to optimize the average fidelity of a plurality of training states, wherein training the encoder circuit comprises training a first and second subset of the set of qubits of the encoder circuit to reduce a latent space of the target circuit by at least one qubit; and
        receiving the set of quantum states generated by at least one quantum circuit, having a depth D1 and a first cost function having a first cost value C1; and
    wherein the system further comprises a reduced-cost circuit trainer training the reduced-cost circuit to act on the set of qubits as a generative model to reproduce the set of quantum states output from the target circuit, the reduced-cost circuit having a second depth D2 and being associated with a corresponding second cost function having a second cost value C2, wherein at least one of the following is true: (1) C2 is less than C1; and (2) D2 is less than D1.

10. The system of claim 9, wherein C2 is less than C1 and D2 is less than D1.

11. The system of claim 9, wherein C2 less than C1.

12. The system of claim 9, wherein D2 is less than D1.

13. The system of claim 9, wherein the first cost function calculates a first energy cost and wherein the second cost function calculates a second energy cost.

14. The system of claim 9, wherein the first cost function represents a first function of a first number of gates within a circuit and wherein the second cost function represents a second function of a second number of gates within the circuit.

15. The system of claim 9, wherein the first cost function represents a first fidelity F1 of a first output state of the decoder circuit compared to a reference state.

16. The system of claim 15, wherein the second cost function represents a second fidelity F2 of a second output state of the decoder circuit compared to the reference state, wherein F1<F2.

* * * * *